United States Patent [19]

Braun

[11] Patent Number: 5,672,865

[45] Date of Patent: *Sep. 30, 1997

[54] TIMING DEVICE FOR CONTROLLING MACHINERY AND OTHER SERVOMECHANICAL DEVICES AND METHOD OF MANUFACTURE THEREFOR

[76] Inventor: Paul-Wilhelm Braun, Lindlau Str. 23, D-53842, Troisdorf, Germany

[*] Notice: The term of this patent shall not extend beyond the expiration date of Pat. No. 5,508,088.

[21] Appl. No.: 622,064

[22] Filed: Mar. 26, 1996

[30] Foreign Application Priority Data

Mar. 27, 1995 [DE] Germany .................. 295 04 883.2

[51] Int. Cl.[6] .................................................. G01D 5/30
[52] U.S. Cl. ................... 250/233; 250/230; 250/231.18
[58] Field of Search .............................. 250/230, 233, 250/231.16, 231.18

[56] References Cited

U.S. PATENT DOCUMENTS

| | | | |
|---|---|---|---|
| 3,965,349 | 6/1976 | Jespersen | 250/233 |
| 3,991,789 | 11/1976 | Wojcikowski | 250/233 |
| 4,092,533 | 5/1978 | Ohsako et al. | 250/231.16 |
| 4,644,156 | 2/1987 | Takahashi et al. | 250/231 |
| 4,661,697 | 4/1987 | Takahashi et al. | 250/231 |
| 4,731,638 | 3/1988 | Cherian | 250/233 |
| 4,757,196 | 7/1988 | Yamada et al. | 250/231 |
| 4,806,751 | 2/1989 | Abe et al. | 250/231 |
| 5,508,088 | 4/1996 | Braun | 428/195 |

FOREIGN PATENT DOCUMENTS

| | | |
|---|---|---|
| 386900 | 10/1988 | Austria. |
| 0497742 | 5/1992 | European Pat. Off.. |
| 61-167815 | 7/1986 | Japan. |
| 4074691 | 10/1992 | Japan. |
| 2163253 | 2/1986 | United Kingdom. |
| 2173295 | 10/1986 | United Kingdom. |
| 2276238 | 9/1994 | United Kingdom. |

*Primary Examiner*—Edward P. Westin
*Assistant Examiner*—Kevin Pyo
*Attorney, Agent, or Firm*—Brumbaugh, Graves, Donohue & Raymond

[57] ABSTRACT

Disclosed are a timing device for controlling machine tools, handling equipment or other servomechanical elements and a method of manufacture. The timing device comprises a timing control element having a light sensitive layer including thereon a plurality of transparent windows and opaque windows arranged in a selected pattern, a reflective means disposed behind the light sensitive layer, and a carrier material disposed behind the reflective means. A transmitter emits light toward the timing control element. The device further comprise means for operating the timing control element to controllably select one of the transparent and opaque windows to be in the path of the emitted light. The emitted light propagates through one of the transparent windows, and is reflected by the reflective means only when the selected window is transparent. A receiver, disposed adjacent to the transmitter, generates an electrical signal in response to the reflected light.

20 Claims, 4 Drawing Sheets

TIMING DEVICE FOR CONTROLLING MACHINERY AND OTHER SERVOMECHANICAL DEVICES AND METHOD OF MANUFACTURE THEREFOR

BACKGROUND OF THE INVENTION

The invention relates to a timing device for controlling machine tools, handling equipment or other servomechanical devices, and to a method of manufacture therefor. The timing device typically comprises a timing control element, a transmitter, and a receiver.

In general, timing control elements are either rotatable about a central axis, i.e., timing disk, or are movable in a linear direction, i.e., timing rule. Light, projected by a transmitter, passes through the control element, and is intercepted by the receiver. The receiver, responsive to the light, converts the light into an electrical signal capable of controlling machinery and other servomechanical devices.

Timing control elements typically are encoded with a selected window pattern, i.e., they have an annular or linear array of windows which alternate in a transparent window, opaque window, transparent window, opaque window pattern. While the transparent window openings allow the transmitted light to pass through the timing disk or rule, the opaque windows prevent the light from passing through the timing disk or rule.

Timing disks as a rule are fixed to a rotating shaft by means of a hub. For linear systems, timing rules are arranged at right angles to a source of light and the associated receiver generates an electrical signal in response to the incoming light. This particular application is used, for example, to control the feeding action of machine tools.

As the timing disk rotates or the timing rule moves in a linear direction, light is directed at the selected window pattern. Because of the window pattern, the transmitted light can only pass through a transparent window. In response to the light, the receiver generates an electrical signal.

The electrical signals serve to establish a control surface for the measurement of rotational speed, acceleration and more accurate positioning of servomechanical elements, as for example a printing head, a robot arm, or a tool carrier.

Timing control elements can be made of glass, metal or plastic, however, plastic and metal are typically used in mass production applications. They are produced, for example, in the case of angle indicators or encoding units, e.g. ink jet printers, out of transparent films.

Timing control elements are generally constructed of light sensitive film. Coding of the film occurs when the film is exposed to light passed through a template means. The coding results in the production of an alternating pattern of transparent and opaque windows. Individual disks or rules are then cut out of the film material to generate timing disks or timing rules, respectively.

Known timing devices utilize an arrangement whereby the transmitter is placed on one side of the timing structure and the receiver is placed on the other side of the timing structure to capture the light as it passes through the disk. This arrangement has been known to cause a number of problems, including: a requirement for a complex electro-mechanical apparatus, increased mechanical stress caused by oscillating loads, a larger footprint size for the timing device, and dirt forming on the timing structure, thereby preventing light from passing efficiently through the structure.

One device disclosed in U.S. application Ser. No. 08/312,602 has addressed these problems by placing a reflective means behind a light sensitive layer having the transparent and opaque windows arranged in a selected pattern. This enables the transmitter and receiver to be located on the same side of the timing device. In the disclosed device, a reflective layer is disposed on a rear surface of the light sensitive layer, and a transparent material is disposed on an opposing surface of the light sensitive layer. Thus, the emitted light must pass through both the transparent layer and the light sensitive layer before it is reflected. For improving resolution it is advantageous to minimize the distance travelled by the beam of light, thus there is room for improvement over this prior art timing device.

SUMMARY OF THE INVENTION

An object of the present invention is to provide a timing device which has a simpler design, and which is not prone to mechanical stresses such as oscillation forces.

It is another object of the present invention to provide a timing device which enables the transmitted light to be efficiently received by an electrical signal generating receiver.

It is yet another object of the present invention to provide a timing device of the above-described type in which diffraction of the beam of light is reduced, thus improving resolution.

The objects of the present invention are achieved by providing a timing device for the accurate positioning of machine tools, handling equipment or other servomechanical elements. The device has a timing control element including thereon a plurality of transparent windows and opaque windows arranged in a selected pattern. A reflective means is disposed behind the transparent and opaque windows for reflecting light. The device further comprises means for operating the timing control element to controllably select one of the transparent and opaque windows to be in the path of the emitted light. The emitted light propagates through the selected window and is reflected by the reflective means only when the selected window is transparent. A receiver is disposed adjacent to the transmitter for generating an electrical signal in response to the reflected light.

The timing control element comprises a light sensitive layer having the transparent and opaque windows, and the reflective means disposed on a rear surface of the light sensitive layer. The control element further comprises a transparent or opaque carrier material disposed on a rear surface of the reflective means.

The reflective means has a metallic coating which is formed by a thin-film process. The metallic coating comprises a selected metal of copper, aluminum, chromium and silver.

The timing control element can be either a timing disk or a timing rule. The timing disk is a rotatable disk having the transparent and opaque window pattern on the periphery thereof. The selected window pattern can be selected from a plurality of patterns arranged concentric to one another on the rotatable disk.

The timing rule also has the transparent and opaque window pattern disposed thereon, so that the respective patterns are arranged in a selected sequence on the timing rule. The window pattern can be such that the sizes of the transparent and opaque windows are uniform, or the pattern can bear a logarithmic relationship. The timing rule has means for fastening the timing rule in a pre-selected location. The means for fastening includes fastening openings located at each end of the timing rule.

A method for producing a timing control element including a light sensitive layer includes the steps of applying a reflective coating to a front surface of the carrier material. Next, a light sensitive layer is applied to a front surface of the reflective coating. Light is then passed through a template means having a selected window pattern onto the light sensitive layer. The light sensitive layer is then exposed to the window pattern to encode the light sensitive layer according to the selected window pattern. After the exposure process, the portions of the light sensitive layer which have been exposed to the light are transparent windows, while the non-exposed portions of the light sensitive layer are opaque windows, i.e., black and non-reflecting.

The reflective means of the timing control element comprises a metallic coating which is produced by a thin-film process. The metallic coating is vapor-deposited on the front surface of the carrier material by a high-vacuum process so that the metallic coating is adhered to the carrier material. Generally, the metallic coating is comprised a selected metal of copper, aluminum, chromium and silver.

Thus, through utilization of the reflective means, the present invention enables an arrangement wherein the transmitter and receiver are located adjacent to each other on the same side of the timing structure. Thus, the transmitter and receiver—that is to say, source of light and optical sensor—may be combined in a chip and thus intimately associated with the timing disk. As a result, light path distances are reduced, the oscillatory load is smaller, and the dust hazard is virtually eliminated. The light path distance is further reduced by having the reflective material and the light sensitive layer both located on the side of the carrier material which is closest to the transmitter and receiver rather than applying a transparent material to the front side of the light sensitive material.

DETAILED DESCRIPTION

Figure 1:
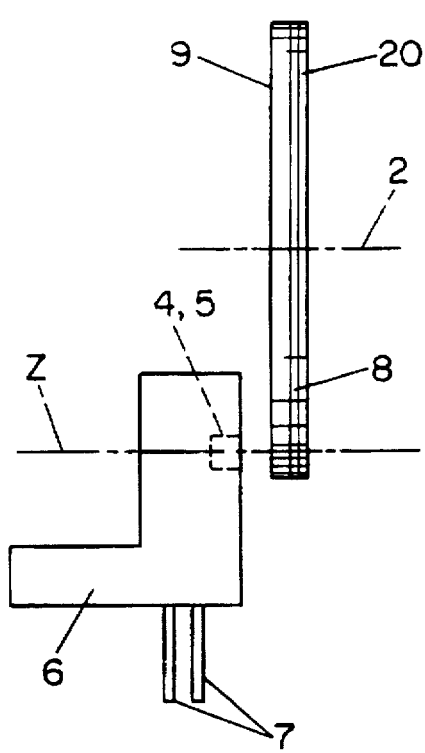
FIG. 1 shows a cross-sectional side view of a timing disk template in accordance with the present invention with transmitter and receiver components located on the same side of the timing disc.
Figure 1A:
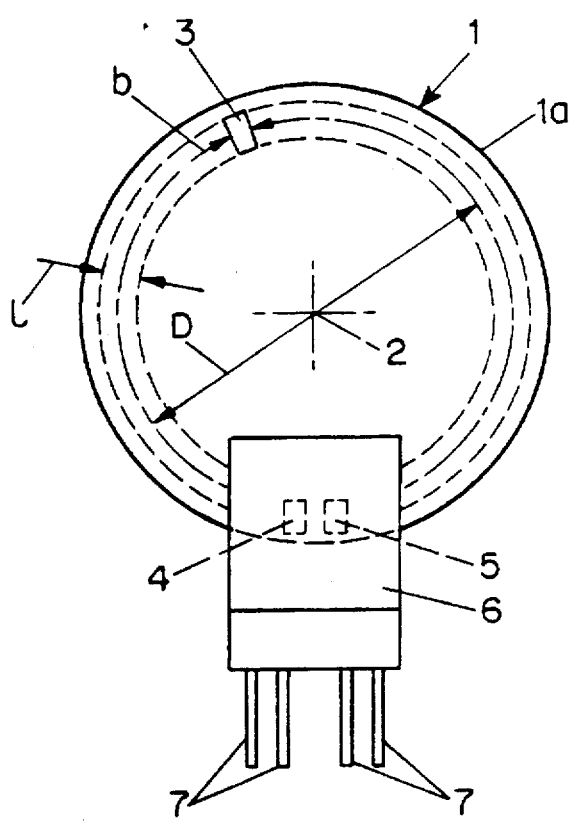
FIG. 1a shows a frontal view of a timing disk template with a transmitter/receiver component.
Figure 1B:
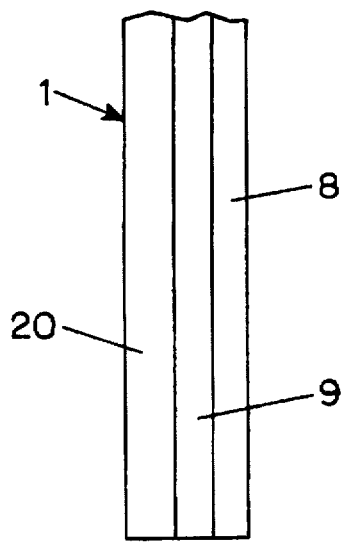
FIG. 1b shows a cross-sectional side view of a section of a prior art timing disk template.
Figure 4:
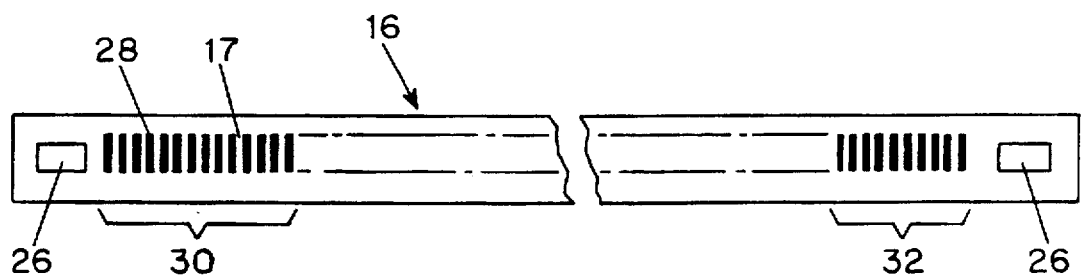
FIG. 4 shows a frontal view of a timing ruler according to the present invention.

As shown in FIG. 1a, a timing device 1a for the accurate positioning of machine tools, handling equipment or other servomechanical elements includes a timing control element 1 or timing disk 1 having a diameter (optical diameter D) and which rotates about an axis 2. As shown in FIG. 4, the timing control element can also be a timing rule 16 movable in a linear direction.

Figure 1C:
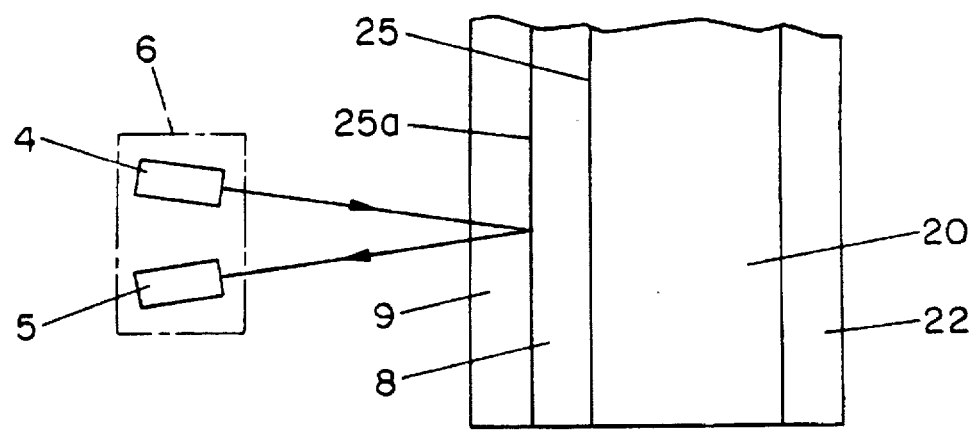
FIG. 1c shows a cross-sectional side view of a section of a timing disc template according to the invention with a transmitter/receiver component.
Figure 1D:
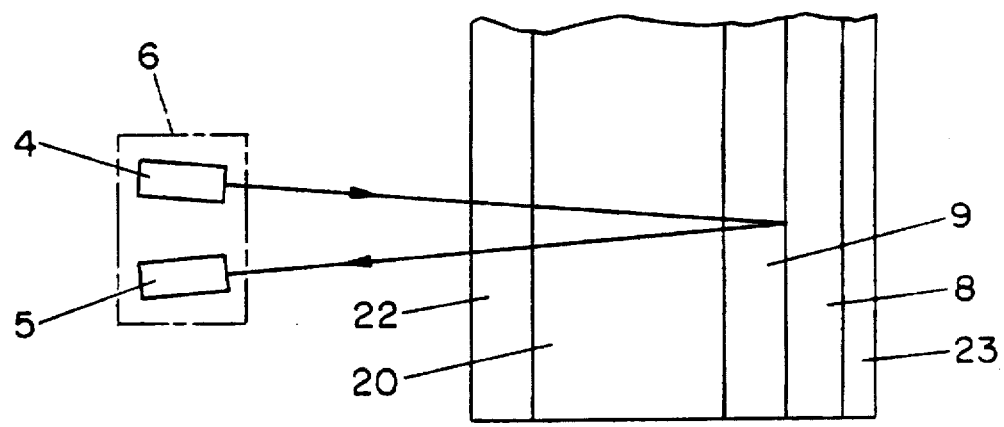
FIG. 1d shown a cross-sectional side view of a section of another prior art disc template with a transmitter/receiver component.

In FIG. 1a, the timing disk 1 includes a plurality of transparent windows 3 and opaque windows having a length 1 and a width b. The transparent windows 3 and the opaque windows are arranged on the outer periphery of the timing disk 1 in a selected window pattern. As seen in FIG. 1c, a reflective means 8 is disposed behind the light sensitive layer 9 which includes the transparent windows 3 and opaque windows.

As shown in FIG. 1, the transmitter 4 emits light along optical axis z toward the timing control element 1. The timing device 1 further comprises a control mechanism (not shown) for operating the timing control element to select one of the transparent and opaque windows to be in a path of the emitted light. The emitted light propagates through the selected windows and is reflected by the reflective means 8 only when the selected window is transparent. A receiver 5, disposed adjacent to the transmitter 4, generates an electrical signal in response to the reflected light. Lines 7 connect the transmitter 4 and the receiver 5 to a control circuit (not shown).

As shown in FIGS. 1 and 1c, the timing control element 1a comprises a light sensitive layer 9 having transparent 3 and opaque windows, a reflective layer 8, and a transparent or opaque carrier material 20. The reflective material 8 is applied to a front side of the carrier material, and the light sensitive layer 9 is applied to a front side of the reflective material 8, as shown in FIG. 1c. An antistatic gelatin layer 22 may be applied to the rear side of the carrier material 20.

Figure 1E:
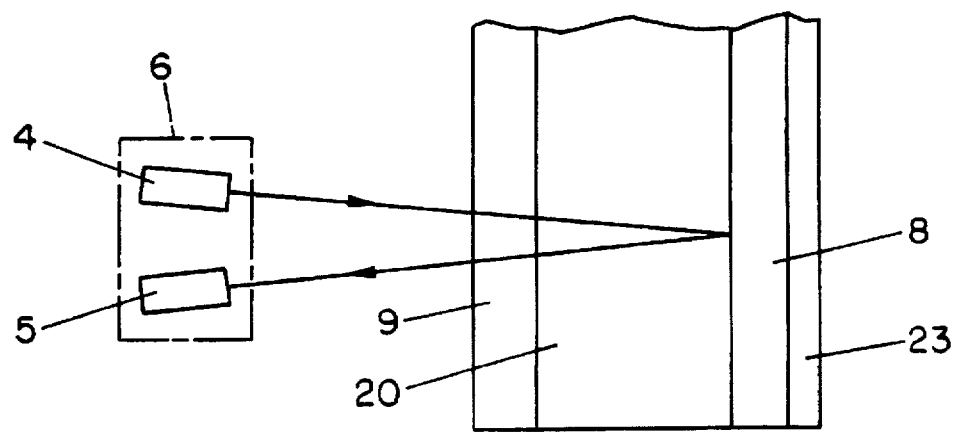
FIG. 1e shows a cross-sectional side view of a section of another prior art timing disc template with a transmitter/receiver component.

In principle, the light sensitive layer 9 may alternatively be arranged on the other side of the carrier material 20, adjacent to a sensor 6, as shown in FIG. 1e. In that case, however, diffraction phenomena may occur when the light emitted by the transmitter 4 passes through the light sensitive layer 9. Hence it is advantageous to minimize the distance between the layers traversed by the light after reflection. Thus, in accordance with the present invention, the light sensitive layer and the reflective layer are both disposed on one side of the carrier material, that being the side which is closest to the transmitter and receiver.

The reflective means 8 comprises a layer having a metallic coating, formed by a thin-film process, which includes a selected metal of copper, aluminum, chromium and silver. The thin-film process includes the step of vapor coating the carrier material 20 on a front side by a high-vacuum process. A protective layer 23 may also be applied to the metallic coating to protect the reflective means 8 against mechanical damage.

Figure 3:
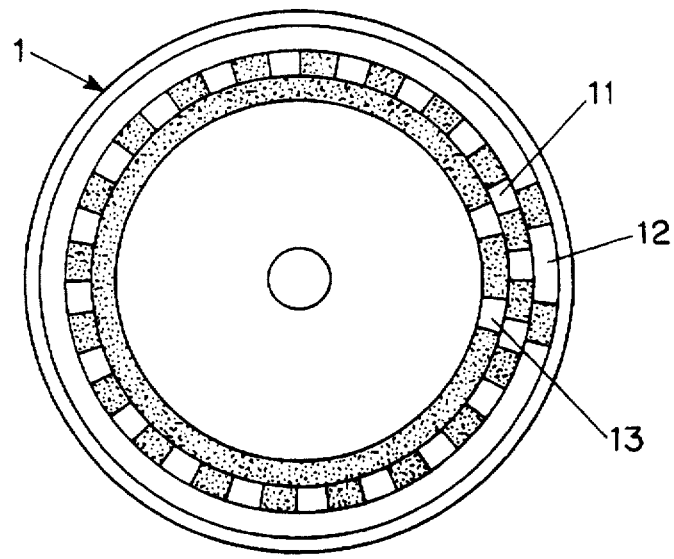
FIG. 3 shows frontal view of a timing disc template according to the present invention having a plurality of patterns arranged concentric to one another.

As seen is FIG. 3, the timing control element comprises a rotatable disk having the transparent 12 and opaque 11 window patterns on the periphery thereof. The selected window pattern is selected from a plurality of patterns 11, 12, 13 arranged concentric to one another on the rotatable disk.

Alternatively, as seen in FIG. 4, the timing control element comprises a timing rule 16 having the transparent 17 and opaque 28 window pattern disposed thereon. The window patterns 30, 32 are arranged in a selected sequence on the timing rule 16. The sizes of the transparent 17 and opaque 28 windows in one of the selected patterns 30 are uniform. In another of the selected patterns 32, the sizes of the transparent 17 and opaque 28 windows bear a logarithmic relationship.

The timing rule 16 further comprises means for fastening the timing rule in a pre-selected location. The means includes fastening openings 26 located at each end of the timing rule 16.

Figure 2A:
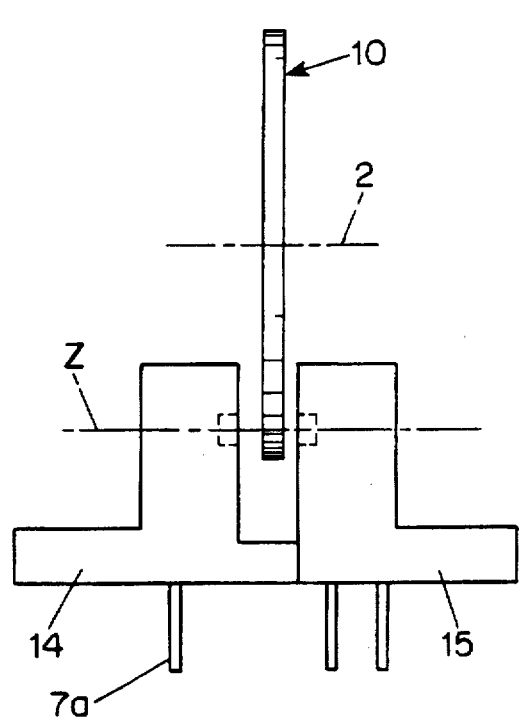
FIG. 2a shows a cross-sectional side view of a prior art timing disc template with a transmitter component and a receiver component located on opposite sides of the timing disc.
Figure 2B:
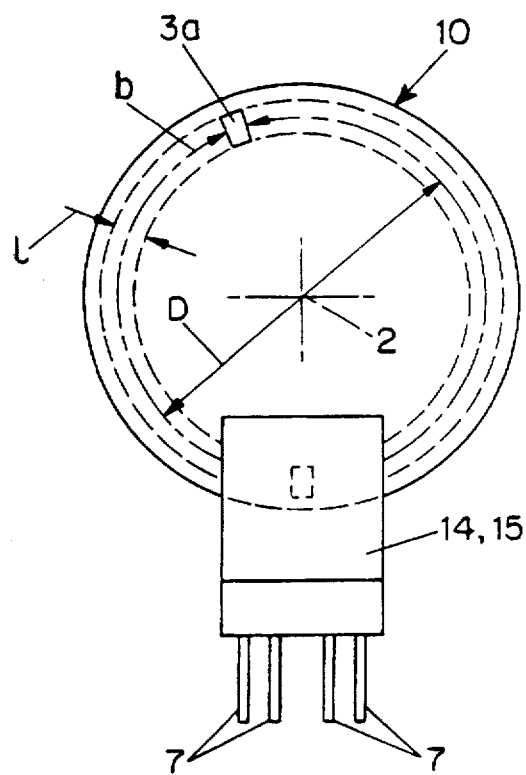
FIG. 2b shows a frontal view of a prior art timing disc template with a transmitter component and a receiver component on opposite sides of the timing disc.
Figure 2C:
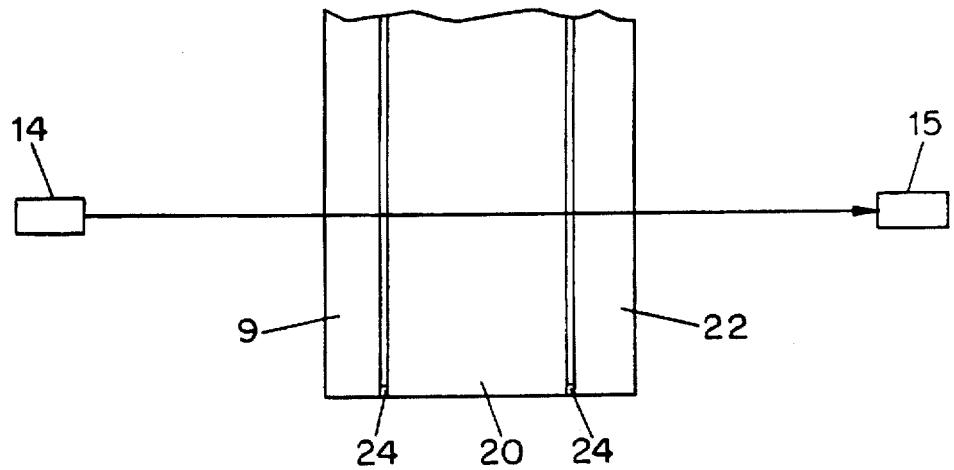
FIG. 2c shown a cross-sectional side view of a section of a prior art timing disc template with a transmitter component and a receiver component on opposite sides of the timing disc.

Similarly to FIG. 1a, FIG. 2b shows a prior art timing disk 10 having a diameter (optical diameter D) and which is rotatable about an axis 2. On the outer periphery of the timing disk 10, windows 3b are arranged, having a length 1 and a width b. As shown in FIGS. 2a and 2c, the prior art timing device has the transmitter 14 and the receiver 15 positioned on opposite sides of the timing disk 10. FIG. 2c illustrates such a prior art device in which a light sensitive layer 9 and an antistatic gelatin layer 22 are applied to opposite sides of the carrier material 20 by means of an adhesive material 24 interposed therebetween.

Because the transmitter and the receiver are located on opposite sides of the timing disk 10, the optical path of the light is much longer than when the transmitter and receiver are located on the same side of the timing disk 10. Additionally, the configuration in FIG. 2a utilizes an increased number of control lines 7a, and utilizes larger components, therefore the space required for the prior art timing device shown in FIG. 2a is greater than for the timing device according to the invention.

To produce a timing disc according to the present invention, a reflective layer 8 is applied to a front surface 25 of the carrier material 20. A light sensitive layer 9 is then applied to a front side 25a of the reflective layer 8. Light is then passed through a template means (not shown) having a selected pattern. The light sensitive layer 9 is exposed to the selected window pattern in order to encode the layer according to the selected window pattern. As shown in FIG. 3, the portions of the light sensitive layer 9 exposed to the light become transparent windows 12, 13 when developed, while the portions not exposed to the light become opaque windows 11 when developed. The opaque windows 11 are black and do not allow light to pass through onto the reflective means 8.

To reflect light from the transmitter 4 to the receiver 5, the front surface 25 of the carrier material 20 is vapor coated with a reflective layer. The reflective layer 8 comprises a metallic film which is disposed on the carrier material 20 via a high vacuum process. Use of this technique generates reflectivity levels of over 90%. Other thin-film methods which may be employed include the sputter technique.

The composition of the metallic layer is dependent on the wavelength of the transmitted light and the level of adhesion required between the light sensitive layer 9 and the reflective means 8. For example, when the transmitted light has a wavelength of approximately 700 manometers, the following metallic layers may be employed: copper, aluminum, chromium and silver.

The inventive methodology enables one to produce products of high quality and dependability, and high resolution.

The inventive timing devices are preferably employed in ink-jet printers. In color printing especially, accurate positioning of the printer head over the photosensory system integrated in a control circuit is required. A simple and economical construction is possible due to the fact that the transmitter 4, receiver 5 and sensor 6 are positioned on the same side of the timing device.

In the various figures showing the timing disks, the codings have been predominantly represented by slits (See FIGS. 1a and 2a). In principle, however, other geometric forms are possible; in particular, single and multiple channels.

For example, FIG. 3 shows a timing disk 1 having a plurality of patterns 11, 12, 13 arranged concentric to one another on the rotatable disk.

The geometrical shape of the timing control element can also vary. FIG. 4 shows a timing control element in the form of a timing rule 16 wherein the window patterns 30, 32 are arranged in a selected sequence. In one pattern 30, the sizes of the transparent 17 and opaque 28 windows are uniform. In another pattern 32, the transparent 17 and opaque 28 windows bear a logarithmic relationship.

The timing rule 16 of FIG. 4 further comprises means for fastening the timing rule in a pre-selected location. The means includes fastening openings 26 located at each end of the timing rule.

Although the present invention has been described in connection with the foregoing embodiments and illustrations, these embodiments are merely illustrative and are not intended to be limiting. Other modifications and improvements should be readily apparent to those skilled in the art, and the present invention encompasses these modifications and improvements.

I claim:

1. A timing device comprising:
    a timing control element having a light sensitive layer including thereon a plurality of transparent windows and opaque windows arranged in at least one pattern, a reflective means disposed behind said light sensitive layer for reflecting light, and a carrier material disposed behind said reflecting means;
    a transmitter for emitting light toward said timing control element;
    means for operating said timing control element to controllably select one of said transparent and opaque windows in said at least one pattern to be in a path of the emitted light, the emitted light propagating through the selected window and being reflected by said reflective means only when the selected window is transparent; and
    a receiver, disposed adjacent to said transmitter, for generating an electrical signal in response to the reflected light.

2. The timing device of claim 1, the reflective means being disposed on a rear surface of the light sensitive layer, and the carrier material being disposed on a rear surface of the reflective means.

3. A timing device of claim 2, the carrier material being a transparent material.

4. The timing device of claim 3, wherein the reflective means comprises a layer having a metallic coating.

5. The timing device of claim 4, wherein the metallic coating is formed by a thin-film process.

6. The timing device of claim 5, wherein the metallic coating comprises a selected metal of copper, aluminum, chromium and silver.

7. The timing device of claim 4, wherein a protective layer is added to the metallic coating to protect said reflective means against mechanical damage.

8. The timing device of claim 2, the carrier material being an opaque material.

9. The timing device of claim 8, wherein the reflective means comprises a layer having a metallic coating.

10. The timing device of claim 9, wherein the metallic coating is formed by a thin-film process.

11. The timing device of claim 10, wherein the metallic coating comprises a selected metal of copper, aluminum, chromium and silver.

12. The timing device of claim 9, wherein a protective layer is added to the metallic coating to protect said reflective means against mechanical damage.

13. The timing device of claim 1, wherein the timing control element comprises a rotatable disk having said transparent and opaque windows in said at least one pattern on the periphery thereof.

14. The timing device of claim 13, wherein said transparent and opaque windows are arranged in a plurality of patterns and wherein said at least one pattern is selected from said plurality of patterns arranged concentric to one another on the rotatable disk.

15. The timing device of claim 1, wherein the timing control element comprises a timing rule having thereon said transparent and opaque windows along said rule.

16. The timing device of claim 15, wherein said transparent and opaque windows are arranged in a plurality of patterns in a sequential order, and wherein at least one pattern is selected from said plurality of patterns.

17. The timing device of claim 16 further comprising means for fastening said timing rule in a pre-selected location.

18. The timing device of claim 17, wherein said fastening means includes fastening openings located at each end of the timing rule.

19. The timing device of claim 1, wherein sizes of said transparent and opaque windows are uniform.

20. The timing device of claim 1, wherein the sizes of the transparent and opaque windows bear a logarithmic relationship.

* * * * *